United States Patent [19]
Grant et al.

[11] Patent Number: 5,332,271
[45] Date of Patent: Jul. 26, 1994

[54] HIGH TEMPERATURE CERAMIC NUT

[76] Inventors: Robert W. Grant, 6454 Murray Hill Rd., Excelsior, Minn. 55331; Richard E. Novak, 2000 Fountain La., Plymouth, Minn. 55447; James S. Molinaro, 1441 Deerfield Dr., #150, Allentown, Pa. 18104

[21] Appl. No.: 769,778

[22] Filed: Oct. 2, 1991

[51] Int. Cl.⁵ .................... F16L 15/04; F16L 25/00
[52] U.S. Cl. .................... 285/334.5; 285/39; 285/187; 285/911
[58] Field of Search .......... 285/422, 911, 334.5, 285/39, 187; 411/904, DIG. 2; 470/18, 23, 24; 264/241; 425/402; 65/374.13, DIG. 8

[56] References Cited

U.S. PATENT DOCUMENTS

| | | | |
|---|---|---|---|
| 2,294,160 | 8/1942 | Crane et al. | 285/911 X |
| 2,439,385 | 4/1948 | Thayer et al. | 285/422 X |
| 2,973,997 | 3/1961 | Kirkland | 285/911 X |
| 3,544,281 | 12/1970 | Phillips | 285/911 X |
| 3,679,237 | 7/1972 | De Angelis | 285/911 X |
| 4,135,866 | 1/1979 | Winkler | 285/911 X |
| 4,582,444 | 4/1986 | Miskinis | 285/911 X |

Primary Examiner—Dave W. Arola

[57] ABSTRACT

High temperature ceramic nut of aluminum oxide for use in coupling a flared tube to a flare fitting.

1 Claim, 3 Drawing Sheets

HIGH TEMPERATURE CERAMIC NUT

BACKGROUND OF THE INVENTION

1. Field of the Invention

The present invention pertains to a nut for coupling a flared tube to a flared fitting, and more particularly, pertains to a nut which is capable of withstanding a wide range of temperature excursions without disintegrating or thermal creeping.

2. Description of the Prior Art

The prior art devices offer a coupling scheme consisting of a vessel or container of PFA or PVDF fitting which is capable of withstanding temperatures up to 180° C., and flared tubing of TEFLON or PFA which is similarly rated. The nuts, however, of PFA or PVDF do not offer temperature range compatibility when exposed to strong oxidizers, such as sulfuric acid, of the nuts of PVDF. The nuts of PVDF cannot withstand high temperature or wide temperature excursions and tend to disintegrate. The nuts of PFA, while capable of high temperature excursions, and resisted disintegration, but would tend to unscrew or creep, thus violating the integrity of the seal.

The prior art attempts to solve the creep issue include high temperature plastics such as PEEK (Poly Ethyl Ethyl Ketone) and others. These were not compatible with the strong oxidizers, such as sulfuric acid or with hot solvents. Attempts were made by Nisso of Japan to TEFLON coat these polymers, but it did not work too well due to pinholes, etc. Asti Corporation of France also produced flare fittings for the European market, but also did not solve the high temperature opportunity. Later, Fluoroware Corporation adopted the flare methodology and included some of the PVDF and TEFLON, etc. fluoropolymer materials loaded with various fibers to add rigidity, where some of these ideas included carbon and glass, but these also did not work well. The creep issue still prevailed until this invention.

The present invention overcomes the failings of the prior art by providing a ceramic nut which withstands a large range of temperature excursions without failure or creeping.

SUMMARY OF THE INVENTION

The general purpose of the present invention is to provide a ceramic nut for coupling a flared tube to a flared fitting which withstands high temperature variations.

According to one embodiment of the present invention, there is provided a ceramic nut composed of 90–99 percent aluminum oxide including a body, a top surface, a bottom surface, a surface between the top surface and bottom surface, a threaded inner surface, a first smooth annular surface, a second larger smooth annular surface between the first smooth annular surface, and an annular clamping surface at one edge of the first smooth annular surface.

One significant aspect and feature of the present invention is a ceramic nut which withstands high operating temperature.

Another significant aspect and feature of the present invention is a ceramic nut which does not disintegrate under a high operating temperature.

Another significant aspect and feature of the present invention is a ceramic nut which does not creep or unscrew under a wide variation of temperatures.

Having thus described one embodiment of the present invention it is the principal object hereof to provide a high temperature ceramic nut for use in coupling a flared tube to a flared fitting.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
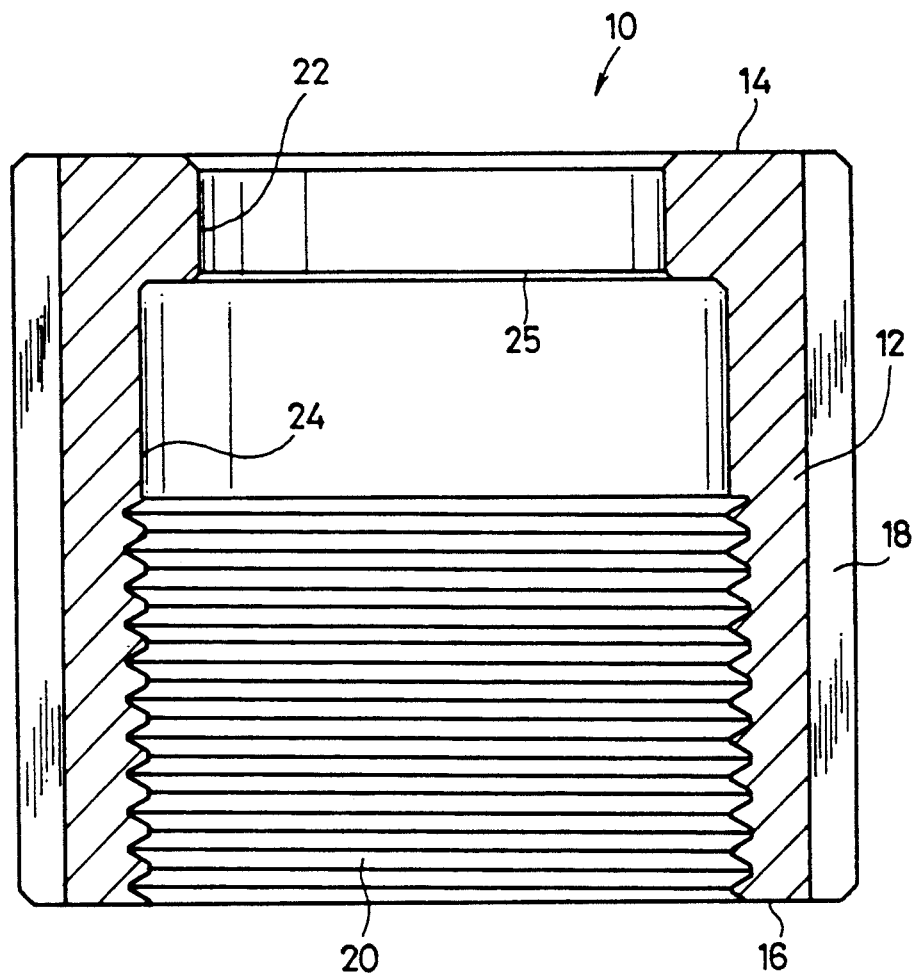
FIG. 1 illustrates a side view in cross-section of the ceramic nut, the present invention.

FIG. 1 illustrates a cross section of a ceramic nut 10, the present invention, including a generally cylindrical shaped body 12, a top surface 14, a bottom surface 16, a side surface 18 between the top surface 14 and bottom surface 16, which is fluted, a centrally located threaded interior surface having threads 20, a smooth annular interior surface 22 aligned with the threaded interior surface 20 and a second smooth interior surface 24 between the first smooth annular surface 22 and the threaded interior surface 20. An annular clamping surface 25 is located at the bottom edge of the smooth annular surface 22. The fluted side surface 18 is chamfered and filleted, but in the alternative can be knurled, hex head shaped or any other desired geometrical configuration. The ceramic nut is constructed of 90–99 percent aluminum oxide.

Aluminum oxide is referred to as alumina. Other ceramics can be used such as zirconia ($ZrO_2$), silicon carbide (SIC), and others which can be fabricated in one way or another. The 96% plus alumina ($Al_2O_3$) is moulded in a "green" state, and then touched up by machining with a diamond tool after firing. This offers one preferred result.

Figure 2:
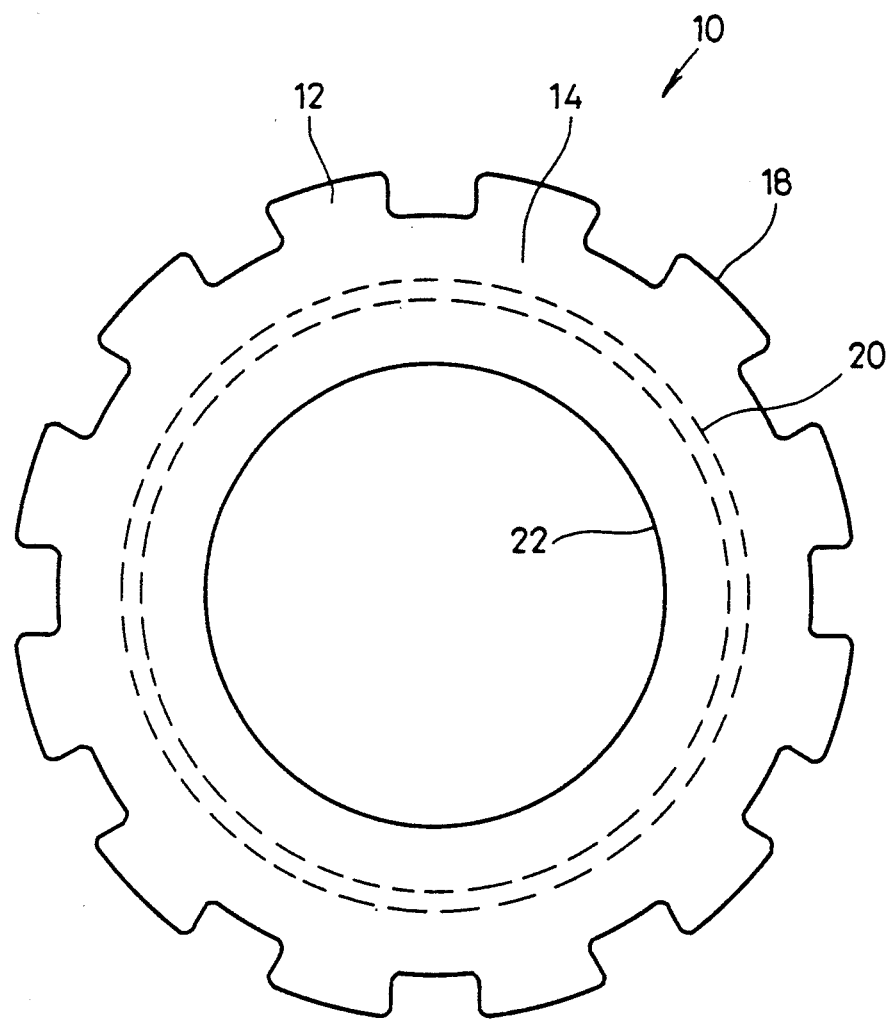
FIG. 2 illustrates a top view of the ceramic nut.

FIG. 2 illustrates a top view of the ceramic nut 10 where all numerals correspond to those elements previously described.

MODE OF OPERATION

Figure 3:
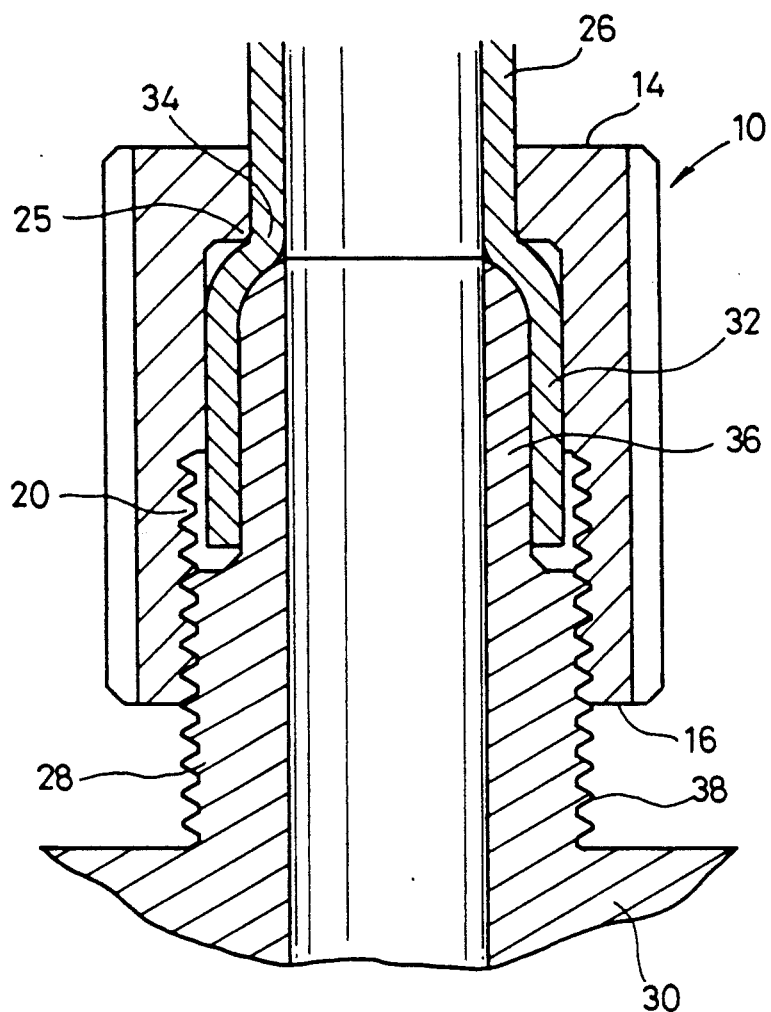
FIG. 3 illustrates the ceramic nut coupling a flared tube to a flare fitting.

FIG. 3 best illustrates the mode of operation where the ceramic nut 10 couples a flared tube 26 to a flared fitting 28 extending from a vessel or container 30. The flared tube 26 includes a flare 32 which begins to flare outwardly at an annular area 34. The flared tube 26 with the overlying ceramic nut 10 is placed over and about the cylindrically shaped portion 36 of the flare fitting 28. Threads 20 of the ceramic nut 10 frictionally engage and tighten against threads 38 of the flared fitting 28 to force the annular clamping surface 25 against the annular area 34, thus effecting a seal between the flared tube 26 and the cylindrical portion 36 of the flare fitting 28.

Various modifications can be made to the present invention without departing from the apparent scope hereof.

I claim:

1. In combination, a ceramic nut, a flared tube and a configured male threaded member secured together for high temperature fluid applications in semiconductor processing applications, comprising:

a. a flared tube with a portion having a first diameter and a flared axially extending portion having a second diameter larger than said first diameter;

b. a male fitting including a cylindrical portion of the diameter of said flared second diameter portion of said flared tube and a threaded portion and an end terminating said cylindrical portion;

c. a ceramic nut including a body, a top surface and a bottom surface;

d. a generally inner threaded lower interior portion of said nut threadedly receiving said threaded portion;

e. a hole in said top surface of said nut; and, f. a geometrically configured inner upper portion of said nut having a cylindrical inner surface extending from adjacent said hole to said inner threaded portion and of a diameter slightly smaller than said inner threaded lower interior portion and of a diameter larger than said hole receiving said flared axially extending cylindrical portion and engaging said flared tube over said cylindrical shaped portion of said male threaded member and said first diameter portion sealingly against said end.

* * * * *

UNITED STATES PATENT AND TRADEMARK OFFICE
CERTIFICATE OF CORRECTION

PATENT NO. : 5,332,271
DATED : July 26, 1994
INVENTOR(S) : Grant et al.

It is certified that error appears in the above-indentified patent and that said Letters Patent is hereby corrected as shown below:

In Claim 1 at Column 4, line 10, after "flared" insert --axially extending cylindrical portion of said --

Signed and Sealed this

Fourth Day of October, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,332,271
DATED : July 26, 1994
INVENTOR(S) : Robert W. Grant et al It is certified that error appears in the above-indentified patent and that said Letters Patent is hereby corrected as shown below:

On the title page: Item [73] Assignee: add "SubMicron Systems, Inc., Allentown, PA".

Signed and Sealed this

Fifteenth Day of October, 1996

Attest:

BRUCE LEHMAN

*Attesting Officer*     *Commissioner of Patents and Trademarks*